3,151,990
COLLAGEN CASING

James T. McKnight, Somerville, N.J., assignor to Johnson & Johnson, a corporation of New Jersey
Filed June 5, 1961, Ser. No. 114,823
12 Claims. (Cl. 99—176)

This invention relates to an improved collagen casing and more particularly to extruded collagen casings derived from a fluid mass of swollen collagen fibrils.

While not limited thereto, the present invention is adapted to being utilized as a casing for sausages of the wiener or frankfurther type. Prior to the present invention, this type of sausage was either prepared by using expensive natural casings or unedible cellulose casings to contain the meat emulsion during the smoking and cooking process. The unedible cellulose casing must be removed by the manufacturer before the wieners are packaged for sale. The resulting product is known in the meat industry as a "skinless" wiener.

There has long been a need for an extruded collagen casing that would be edible, non-toxic and sufficiently strong to stand up under stuffing, linking, smoking, washing and cooking. It is now known that edible casings for pork sausage may be prepared by extruding a tubular body from a fluid mass of swollen collagen fibrils, hardening this tubular body in the wet state and drying the collagen casing so produced. A method of producing such collagen casings is described and claimed in copending application Serial No. 82,934, filed January 16, 1961.

Extruded collagen casings that are suitable for the manufacture of fresh pork sausages may not be entirely satisfactory for the production of sausages of the wiener or frankfurter type. This is due to the differences in processing pork sausages and wieners. Thus, a meat emulsion of the pork sausage type may be stuffed, linked by twisting on a FAMCO linking machine, and packaged for sale without cooking. Sausages of the wiener or frankfurter type, however, are linked on a Ty linker, racked on a stick, smoked at temperatures from about 120° F. to about 170° or 180° F. for several hours, rinsed with hot water at about 180° to 190° F. for several minutes, and then rinsed with cold water for several minutes. It will be appreciated, therefore, that a collagen casing used in the production of frankfurters must of necessity be tougher and have a high wet strength to survive the treatment in the Ty linker.

An additional requirement for the frankfurter casing is that the casing should not become wrinkled and lose bonding to the meat during smoking or the hot and cold rinses that follow smoking. In other words, the casing must be sufficiently elastic (not permanently deformed) so that the stress does not relax during the smoking-rinsing cycle. On chilling after smoking, the meat contracts slightly (becomes more dense) and the casing must also shrink or the finished product will have a poor appearance.

It is an object of the present invention, therefore, to produce a new and improved extruded collagen casing adapted to be utilized as a casing for sausages of the wiener or frankfurter type.

It is another object of the present invention to produce an edible, non-toxic casing that will survive linking in the Ty linker.

It is a further object of this invention to produce an edible collagen casing that will retain a smooth symmetrical appearance after smoking.

Still another object of this invention is to provide an edible collagen frankfurter casing that will not peel off, even when punctured during cooking.

In accordance with the present invention, it has been discovered that a suitable wiener casing may be produced by extruding a fluid mass of swollen collagen fibrils in the form of a tubular body into a coagulating liquid and hardening the tubular body while it is in the wet state. The collagen tube so obtained is washed with water and then treated with a very dilute solution of a reducing sugar. Finally, the sugar-treated casing is dried and then heat-cured by heating for about 16 to 24 hours to a temperature of about 80° C.

While I do not wish to limit the present invention by any particular theory, it seems probable that the small amount of reducing sugar that is added to the collagen in its wet state is absorbed and during the heat-curing cycle effects a chemical bonding, thereby producing a casing with a greater wet tensile strength and toughness, a tighter, less deformable network structure, an increased tendency to shrink during cooking, and an increased tensile strength after cooking. Regardless of the mechanism of the reaction, the improvement in physical properties described above can be obtained by adding a very small amount of a reducing sugar to the casing prior to the drying step.

It must be emphasized that increasing the amount of sugar and changing the heat-treatment conditions will produce an unacceptable product that will shrink too much on cooking. At low sugar concentrations, of the order of 0.005 percent to about 0.20 percent, the increased shrinkage on cooking is so small as to be acceptable with many pork sausages. Thus, by the novel procedure of the present invention, using edible chemicals, a "universal" casing may be obtained in that the casing may be used for Ty linked pork sausage, for Famco linked pork sausage and as a wiener or frankfurter casing.

Suitable sugars for the treatment of collagen casings are reducing sugars which have a free aldehyde or keto group that is not in glucoside combination with other molecules. Examples of such reducing sugars are erythrose, threose, arabinose, ribose, xylose, cyclose, fucose, mannose, glucose (dextrose), galactose, fructose (levulose), etc. These sugars may be most conveniently applied to the collagen casing in the form of dilute solutions. The amount of sugar present in solution is related to the dwell time of the casing in the solution and the reactivity of the sugar used. Thus, a reactive sugar such as galactose may be used at concentrations as low as 0.005%. If the amount of galactose exceeds 0.2%, the sugar curing will proceed too far and result in a brittle casing that can not withstand the stress of Ty linking. A less reactive sugar such as mannose will not produce the required wet tensile strength unless the concentration of reducing sugar is greater than 0.005 percent. It is preferred to add the reducing sugar to the plasticizing bath, which bath follows the washing step and is the last bath contacted before the casing is dried.

The amount of sugar employed in the treating bath is also dependent upon the time and temperature of heat treatment. The sugar-treated casing may be dried and heat-cured at a temperature of about 80° C. Heating the casing above about 85° C. for too long a period degrades the collagen and results in a somewhat brittle casing that breaks when the links are tied. At temperatures appreciably below 70° C., the time required for heat-curing is so long as to be impractical. The preferred method of heat-curing a sugar-treated collagen casing is to dry the casing after it leaves the sugar solution, shirr the casing and then heat the shirred casing in a forced draft oven by raising the temperature slowly from 35° C. to 80° C. during 8 hours. The casing is then heated at 80° C. for an additional 16 hours to complete the curing operation.

It will be understood that the foregoing general description and the following detailed description, as well, are exemplary and explanatory but they do not restrict the invention.

The process for the manufacture of sugar-cured collagen casings of the present invention may be more fully understood from the following detailed description and examples taken in connection with the accompanying drawings, wherein.

Figure 1:
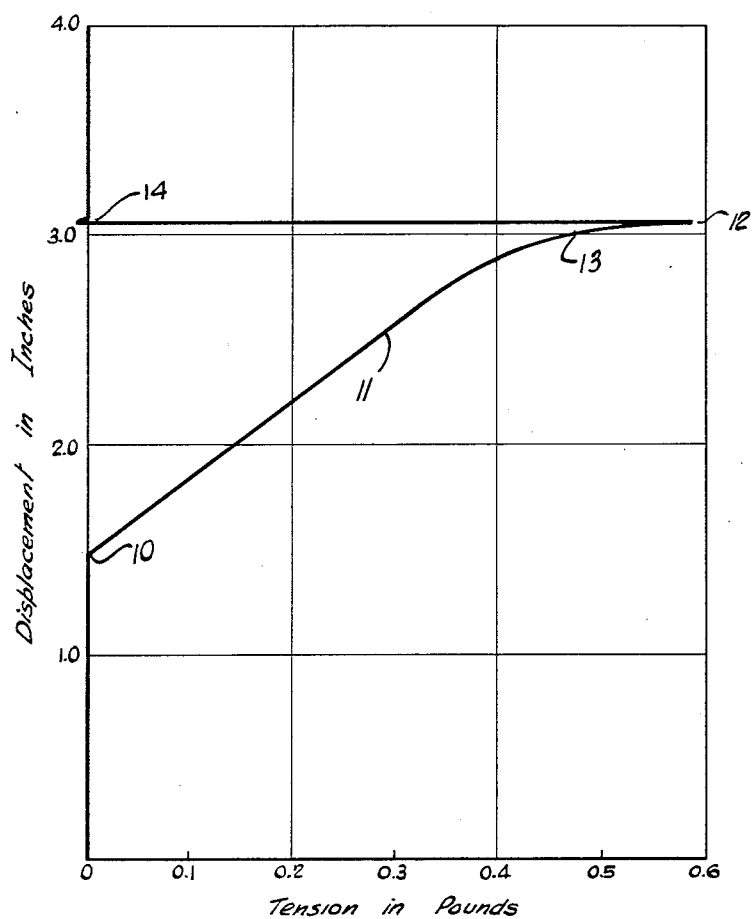
FIGURE 1 is a reproduction of a stress-strain curve of a typical collagen casing of the present invention obtained from an Instron Tensile Tester machine.

Throughout the specification and examples that follow, all quantities are expressed in parts by weight unless otherwise indicated.

*Example 1*

Fresh steer hides are washed with cold water at 60° C. or less in a roating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites prepared from five hides. The hide composites are then cut into ½ to 4 square inch sections and reduced to pulp by three passes through a meat grinder, each pass being a finer grind. The first and second passes are through 18 and 8 millimeter holes respectively. The final grind is through holes 1.5 millimeters in diameter. It is important during the grinding process to keep the pulp below 20° C. This may be done by adding crushed ice to the hides as they are fed to the grinder.

The ground pulp is next diluted with tap water containing a dispersion of hardwood cellulose fibers to give a smooth slurry containing 4 percent dry hide solids and 1 percent dry cellulose fibers. This slurry (200 parts) is then treated with 50 parts of a 6 percent lactic acid solution using an inline mixer such as that manufactured by Cherry-Burrell (Model 24) to form a homogeneous mass of swollen collagen fibrils, and cellulose fibers. It is important during this acid swelling step that the temperature be maintained below about 25° C. The mixture so obtained contains 3.2 percent hide solids, 0.8 percent cellulose fibers and 1.2 percent lactic acid. After the pulp is blended with acid, the mass of swollen collagen fibrils and cellulose fibers is further dispersed in a suitable homogenizer fitted with a two-stage valve and operated with a 1500 p.s.i. drop per stage. The swollen collagen mass so obtained is filtered through a 7-mil filter screen and extruded in the form of a tube in such a way that some collagen fibril orientation is transverse to the direction of extrusion. This may be partially accomplished by inflating the casing as it leaves the nozzle. One form of extruder found useful in practicing the invention is disclosed in copending application Serial No. 82,933, filed January 16, 1961.

The extruded collagen tube of swollen collagen fibrils is coagulated for 6 minutes in an aqueous ammonium sulfate bath containing 40 percent ammonium sulfate adjusted to a pH of 7.0 with ammonium hydroxide and is then prewashed with 15% ammonium sulfate similarly adjusted to pH 7.5 for an equal period of time.

Alum tanning of this extruded casing is accomplished by treatment with an alum solution containing 3 percent alum $[NH_4Al(SO_4)_2 \cdot 12H_2O]$, 0.65 percent citric acid and 4.0 percent ammonium sulfate. The contact time is 6 minutes and this alum tanning solution is maintained at a pH of about 4.3. After the tanning step, the casing is washed in tap water for 17 minutes using three changes of water. The casing is finally plasticized by passing it through a bath containing 3.7 percent glycerol and 0.02 percent dextrose. The dwell time in this bath is 10 minutes. The casing is inflated and dried for 10 minutes in a rapid stream of air and then heat-cured in a forced draft oven raising the temperature slowly from 35° C. to 80° C. during an 8 hour period. The heat treatment at 80° C. is continued for an additional 16 hours.

The casing made by the method described above is of uniform diameter and wall thickness. The casing wall is a smooth and continuous film about 1 mil in thickness and dispersed throughout the wall of the casing may be noted the cellulose fibers that were added to the original cowhide pulp in preparing the collagen mass. The collagen fibrils that make up the casing wall cohere to form a membrane having the glass-like quality of a hyaloid membrane, but unlike the hyaloid membrane which is transparent, the collagen membrane is translucent.

Typical casings made by the process described above are tested on an Instron Tensile Tester to determine certain physical properties. The Instron Tensile Tester is a machine which can apply a tensile load to a sample and simultaneously record on a moving chart the stress-strain curve of the sample under test. The Instron apparatus employed to obtain the data reported below was adapted to the testing of extruded collagen casings by enclosing the clamps of the instrument in an insulated box which could be filled with live steam to maintain the sample at 99° C. All casings tested at 99° C. are pretreated by soaking in a meat emulsion extract for three minutes. This extract is prepared in the following manner.

A mixture of 1 part by weight ground sausage meat and 2 parts by weight is mixed thoroughly in a Waring Blendor and the water extract is separated from the meat by filtration. The meat emulsion extract so obtained is heated to the boiling point to coagulate certain water-soluble proteins and then filtered a second time to give a clear yellow solution that is used to pretreat the casings that are to be tested.

A 4-inch length of the casing which has been soaked for 3 minutes in the meat emulsion extract described above is clamped between the jaws of the Instron Tensile Tester in such a manner that the length of the casing suspended between the two jaws is 3 inches. The jaws of the Instron apparatus are then positioned 1 inch apart and live steam is admitted to the insulated box that surrounds the sample and jaws of the apparatus. The temperature of the casing sample being tested is maintained at 99° C. throughout the entire test procedure.

Three minutes after the steam is admitted to the insulated box that surrounds the casing sample being tested, the clamps of the Instron Tensile Tester are moved apart at the rate of 1 inch per minute until the casing breaks. While the jaws of the apparatus are in motion, the stress or tension exerted by the casing and the distance between the moving jaws is continuously recorded by a moving stylus on graph paper. FIGURE 1 is a reproduction of a typical stress-strain curve from an Instron Tensile Tester chart. It will be noted that the displacement along the ordinate corresponds to the distance separating the jaws of the machine in inches. The displacement along the abscissa corresponds to the load on the jaws or tension exerted by the casing in pounds.

Five important physical properties of the casing under test can be measured from a single stress-strain curve. It will be noted from FIGURE 1 that no tension is recorded until the clamps have moved 1.48 inches apart. This distance from the intersection of the X axis and the Y axis (no displacement) to point 10 is a measure of the length of the casing after steaming for 3 minutes and the original length (3 inches) minus the distance from the point of origin to point 10 is the change of length due to shrinkage, which throughout this specification will be referred to as $\Delta L$. In FIGURE 1, $\Delta L$ is equal to 3 inches minus 1.48 inches or 1.52 inches.

From the slope of the line 10–11 in FIGURE 1, it will be noted that the strain in inches per pound of stress is 3.43. This value, which is related to the reciprocal of Young's modulus, will be referred to throughout the specification as $\epsilon$.

In FIGURE 1, point 12 indicates the sudden breaking point of the casing, the tension dropping suddenly to zero. The point 12 is a measure of the tension or applied force at the break point. The casing having the stress-strain curve illustrated in FIGURE 1 snapped under an applied force of 0.591 pound. The force required to break the casing under the test conditions described above will be referred to throughout this specification as the hot tensile strength.

The stylus trace 10–12 of FIGURE 1 passes through the point 13, at which point the distance between the clamps is equal to the original length of the casing suspended between the clamps (3 inches). The displacement of this point 13 from the Y axis is a measure of the tension exerted when the casing is stretched to its original length. This force, which in the test illustrated by FIGURE 1 amounts to 0.461 pound, will be referred to throughout this specification as the shrink tension.

The line 12–14 of FIGURE 1 intersects the Y axis at 3.04 inches, indicating that the casing measured 3.04 inches in length just prior to breaking. The length of the casing at the break point divided by the original length of the casing suspended between the clamps and multiplied by 100 (3.04 inches ÷ 3 inches × 100), will be referred to throughout the present specification as the percent recovery. In the test illustrated by FIGURE 1, the percent recovery of the casing is 101.

The Instron Tensile Tester may also be used to determine the swell, deformation, modulus and wet tensile strength of typical casings at room temperature. In this experiment, the casings tested are not treated with the meat emulsion. Test samples of the casing are prepared by cutting 2-inch sections, ½-inch wide, from the casing in such a manner that the long direction of the test sample (2 inches) is parallel to the axis of the casing. Other samples are prepared by cutting the 2-inch section in such a manner that the long dimension of the test sample is perpendicular to (across) the axis of the casing. In this way, the physical properties parallel and perpendicular to the direction of extrusion of the casing may be determined.

A 2-inch section of casing ½-inch wide is clamped between the jaws of the Instron Tensile Tester in such a manner that the length of the casing suspended between the two jaws is 1 inch. The jaws of the Instron Tensile Tester are then positioned 1 inch apart and the casing sample is sprayed with distilled water.

Two minutes after the test sample has been soaked with water, the clamps of the Instron Tensile Tester are moved apart at the rate of 1 inch per minute until the distance between the moving jaws is 1.22 inches. The movement of the jaws is then stopped.

Figure 2:
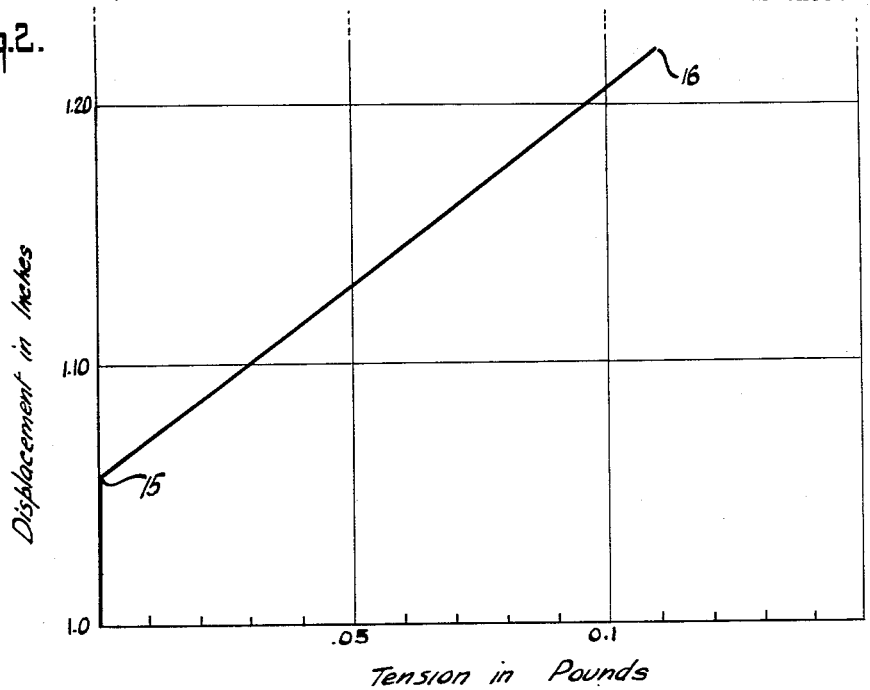
FIGURES 2 and 3 are similar stress-strain curves but differ from FIGURE 1 in the size and temperature of the casing sample tested.

The stylus trace 15–16 of FIGURE 2 is a reproduction of a typical stress-strain curve from an Instron Tensile Tester chart obtained with a wet casing stretched from 1 inch to 1.22 inches at room temperature. It will be noted that no tension is recorded until the jaws have moved 1.057 inches apart (point 15). This distance (1.057 inches) is the length of the casing after it has been wet with water and this distance, minus the original length (1 inch) times 100, is the percent swelling that takes place when the casing is wet out. From FIGURE 2, the percent swelling may be calculated as equal to 1.057 inches minus 1 inch times 100 or 5.7.

From the slope of the line 15–16 in FIGURE 2, it will be noted that the strain in inches per pound of stress is 1.48. This value, which is related to the reciprocal of Young's modulus will be referred to throughout the specification as M (the modulus of the wet casing at room temperature).

The jaws of the Instron Tensile Tester are next reversed so that they approach to within 1 inch, releasing all tension and then the jaws of the Instron Tensile Tester are again moved apart at the rate of 1 inch per minute until the casing breaks. The third stress-strain curve so obtained is illustrated by FIGURE 3, from which curve one may measure the deformation and wet tensile strength.

Figure 3:
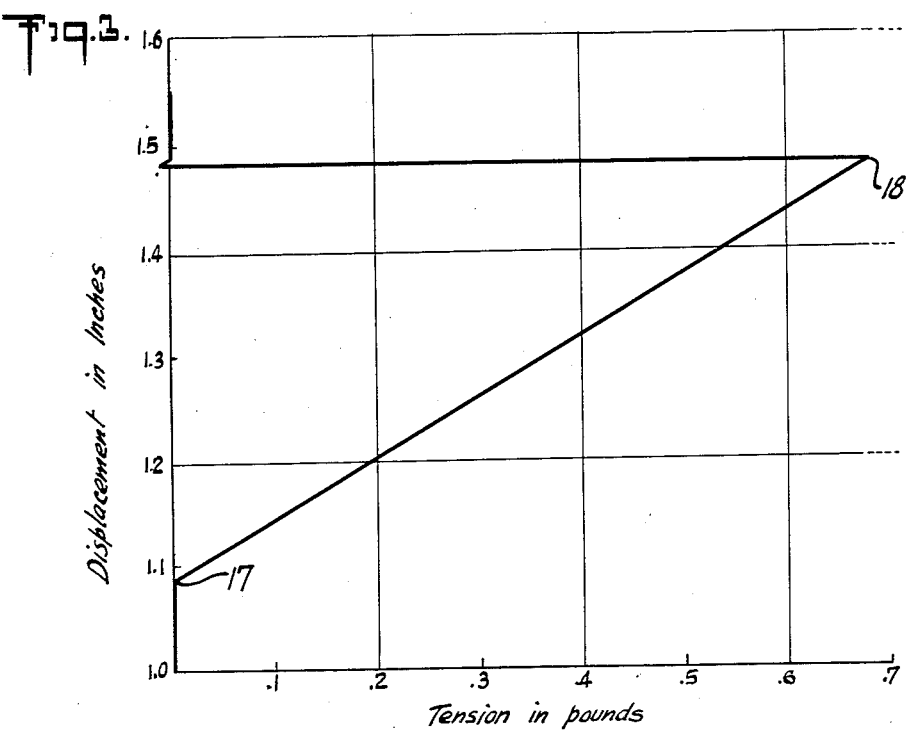

It will be noted from FIGURE 3 that no tension is recorded until the clamps have moved 1.088 inches apart (point 17). This distance is the measure of the length of the casing after it has been wet out, stretched 22 percent and then relaxed. This distance minus the original length (1 inch) is the change of length due to both swelling and deformation under stress and throughout the specification and claims will be referred to as combined swell and deformation.

The percent deformation may be calculated from FIGURES 2 and 3 by subtracting the length of the sample after swelling (indicated at point 15 of FIGURE 2) from the length of the sample after it has been wet out, stretched 22 percent and relaxed (point 17 of FIGURE 3). Thus, the percent deformation of the sample illustrated by FIGURES 2 and 3 is percent deformation equals 1.088 minus 1.057 times 100 or 3.1.

In FIGURE 3, point 18 indicates the sudden breaking point of the casing, the tension dropping suddenly to zero. This point 18 is the measure of the tension or applied force at the break point. The casing having the stress-strain curve illustrated in FIGURE 3 snapped under an applied force of 0.680 pound. The force required to break the wet sample at room temperature under the test conditions described above will be referred to throughout this specification as the wet tensile strength.

Typical casings of the present invention have the following illustrative properties when tested on an Instron Tensile Tester as described above.

The change of length due to shrinkage $\Delta L$ amounts to from about 1.0 inch to about 2.0 inches.

The strain in inches per pound of stress $\epsilon$ is from about 1.0 to about 10.0 inch-pounds. This test is carried out at 99° C.

The hot tensile strength is from about 0.3 pound to about 1.2 pounds.

The shrink tension is from about 0.3 to about 1.0 pound.

The percent recovery amounts to from about 80 to about 150.

The combined swell and deformation which is most important to the stuffing and linking properties of the casing is from about 6% to about 14%.

The modulus at room temperature M (measured either perpendicular or parallel to the direction of extrusion) is from about 0.3 to about 1.5 inch-pounds.

The wet tensile strength (measured either perpendicular or parallel to the direction of extrusion) is from about 0.7 pound to 1.5 pounds. This test is conducted at room temperature.

The burst strength is at least about 10 to 28 pounds per square inch. Burst strength is the air pressure in pounds per square inch required to burst dry extruded collagen casings which have a wall thickness of 1 mil. The values of burst strength expressed in this specification are determined in a Perkins Mullen Tester (Model C). Liquid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, a maximum hand on the gauge remains stationary to indicate the exact pressure at the time the burst occurred.

The casing of this Example I is about 1 mil in thickness and is suitable for casings for sausages of the wiener or frankfurter type. It has the following physical properties:

| | |
|---|---|
| Burst Strength, pounds | 14.0 |
| Shrink Tension Results: | |
|    AL | 1.52 |
|    Initial Modulus, $\epsilon$ | 3.43 |
|    Percent Recovery | 101 |
|    Shrink Tension | 0.461 |
|    Hot Tensile Strength | 0.591 |

| | Parallel | Perpendicular |
|---|---|---|
| Wet Modulus Results: | | |
|    Percent Swell | 3.3 | 5.7 |
|    Percent Deformation | 3.4 | 3.1 |
|    Combined Swell and Deformation | 6.7 | 8.8 |
|    Modulus, M | 0.280 | 1.48 |
|    Wet Tensile Strength | 1.136 | 0.680 |

*Example II*

An extruded collagen casing is prepared exactly as described in Example I above except that the collagen mass extruded contains 4 percent by weight hide solids instead of 3.2 percent hide solids. After proper humidification at 70% relatively humidity and room temperature for 2 days this casing is shirred on conventional shirring equipment, stuffed with pork sausage and linked on the Famco linker. This sausage cooked satisfactorily without rupture of the casing. This casing also performed satisfactorily when stuffed with wiener emulsion and linked with the Ty linker. After smoking, the wiener has a good appearance and cooks satisfactorily. The casing is as tender as a natural casing and has the following physical properties:

| | |
|---|---|
| Burst Strength, pounds | 20.1 |
| Shrink Tension Results: | |
|    AL | 1.66 |
|    Initial Modulus, $\epsilon$ | 3.40 |
|    Percent Recovery | 102 |
|    Shrink Tension | 0.561 |
|    Hot Tensile Strength | 0.641 |

| | Parallel | Perpendicular |
|---|---|---|
| Wet Modulus Results: | | |
|    Percent Swell | 3.81 | 8.40 |
|    Percent Deformation | 7.05 | 5.60 |
|    Combined Swell and Deformation | 10.86 | 14.00 |
|    Modulus, M | 0.420 | 1.46 |
|    Wet Tensile Strength | 1.47 | 0.860 |

*Example III*

A casing is prepared exactly as described in Example I above except that the collagen mass is passed only once through the Manton-Gaulin homogenizer. The concentration of collagen in the mass extruded is 4 percent by weight. The casing so prepared, when properly humidified, is suitable for use as a casing and may be used for either pork sausages or wieners. It does not break on linking or wrinkle during smoking. The casing of this example has the following physical properties:

| | |
|---|---|
| Burst Strength, pounds | 17.9 |
| Shrink Tension Results: | |
|    AL | 1.58 |
|    Initial Modulus, $\epsilon$ | 3.50 |
|    Percent Recovery | 108 |
|    Shrink Tension | 0.519 |
|    Hot Tensile Strength | 0.802 |

| | Parallel | Perpendicular |
|---|---|---|
| Wet Modulus Results: | | |
|    Percent Swell | 2.96 | 9.70 |
|    Percent Deformation | 6.15 | 4.66 |
|    Combined Swell and Deformation | 9.11 | 14.36 |
|    Modulus, M | 0.350 | 1.49 |
|    Wet Tensile Strength | 1.35 | 0.94 |

*Example IV*

An extruded collagen casing is prepared exactly as described in Example I above except that the collagen mass extruded contains 4 percent by weight hide solids instead of 3.2 percent hide solids. The plasticizing bath contains 3.7 percent glycerol and 0.2 percent mannose. The casing is inflated and dried at room temperature and then heated for 20 hours at 80° C.

The casing so obtained is stuffed and passes the Ty linking test. This test is performed by wrapping Ty linker string around the stuffed casing three times and pulling the string up tight with a quick jerk. Casings which pass this test without cutting or breaking may be processed on a Ty linking machine.

The casing of this example has the following physical properties:

| | |
|---|---|
| Burst Strength, pounds | 18 |
| Shrink Tension Results: | |
|    AL | 1.05 |
|    Initial Modulus, $\epsilon$ | 1.20 |
|    Percent Recovery | 96 |
|    Shrink Tension | 0.84 |
|    Hot Tensile Strength | 0.81 |

| | Parallel | Perpendicular |
|---|---|---|
| Wet Modulus Results: | | |
|    Percent Swell | 4.5 | 3.70 |
|    Percent Deformation | 3.5 | 3.60 |
|    Combined Swell and Deformation | 8.0 | 7.30 |
|    Modulus, M | 0.35 | 0.24 |
|    Wet Tensile Strength | 0.77 | 0.89 |

*Example V*

An extruded collagen casing is prepared exactly as described in Example IV above except that the plasticizing bath contains 3.7 percent glycerine and 0.02 percent mannose. The finished casing passed the Ty linking test and has the following physical properties:

| | |
|---|---|
| Burst Strength, pounds | 15 |
| Shrink Tension Results: | |
|    AL | 1.20 |
|    Initial Modulus, $\epsilon$ | 2.50 |
|    Percent Recovery | 109 |
|    Shrink Tension | 0.45 |
|    Hot Tensile Strength | 0.65 |

| | Parallel | Perpendicular |
|---|---|---|
| Wet Modulus Results: | | |
|    Percent Swell | 7.00 | 8.50 |
|    Percent Deformation | 3.80 | 3.30 |
|    Combined Swell and Deformation | 10.80 | 11.80 |
|    Modulus, M | 0.40 | 0.40 |
|    Wet Tensile Strength | 1.08 | 1.10 |

*Example VI*

An extruded collagen casing is prepared exactly as described in Example IV above except that the plasticizing bath contains 3.7 percent glycerine and 0.02 percent galactose. The finished casing passed the Ty linking test and cooks satisfactorily. This casing has the following physical properties:

| | |
|---|---|
| Burst Strength, pounds | 16 |
| Shrink Tension Results: | |
|    AL | 1.20 |
|    Initial Modulus, $\epsilon$ | 2.48 |
|    Percent Recovery | 109 |
|    Shrink Tension | 0.48 |
|    Hot Tensile Strength | 0.72 |

| | Parallel | Perpendicular |
|---|---|---|
| Wet Modulus Results: | | |
|    Percent Swell | 2.00 | 3.50 |
|    Percent Deformation | 3.50 | 4.40 |
|    Combined Swell and Deformation | 5.50 | 7.90 |
|    Modulus, M | 0.33 | 0.36 |
|    Wet Tensile Strength | 0.91 | 0.91 |

Example VII

An extruded collagen casing is prepared exactly as described in Example IV above except that the plasticizing bath contains 3.7 percent glycerol and 0.005 percent galactose. The finished casing passed the Ty linking tests and cooks satisfactorily. This casing has the following physical properties:

| | | |
|---|---|---|
| Burst Strength, pounds | | 13 |
| Shrink Tension Results: | | |
| ΔL | | 1.30 |
| Initial Modulus, ε | | 4.40 |
| Percent Recovery | | 120 |
| Shrink Tension | | 0.29 |
| Hot Tensile Strength | | 0.80 |
| | Parallel | Perpendicular |
| Wet Modulus Results: | | |
| Percent Swell | 6.50 | 7.50 |
| Percent Deformation | 5.00 | 4.10 |
| Combined Swell and Deformation | 11.50 | 11.60 |
| Modulus, M | 0.85 | 0.72 |
| Wet Tensile Strength | 0.75 | 0.85 |

The invention described and illustrated hereinbefore and secured by these Letters Patent is defined in the following patent claims.

What is claimed is:

1. An edible sugar-treated and heat-cured translucent casing of cohered collagen fibrils derived from unlimed hides characterized by a combined swell and deformation of no less than 5.5% and no more than 14.4%.

2. The casing of claim 1 in a shirred condition.

3. The casing of claim 1 wherein the wet tensile strength is no less than 0.68 and no more than 1.5.

4. The casing of claim 1 wherein the shrink tension is no less than 0.29 and no more than 1.0.

5. An edible sugar-treated and heat-cured casing comprising a non-collagenous fibrous material encapsulated in a matrix of unlimed hide collagen fibrils cohered to form a translucent hyaloid structure and characterized by a combined swell and deformation of no less than 5.5% and no more than 14.4%.

6. The casing of claim 5 in a shirred condition.

7. The casing of claim 5 wherein the wet tensile strength is no less than 0.68 and no more than 1.5.

8. The casing of claim 5 wherein the shrink tension is no less than 0.29 and no more than 1.0.

9. The edible sausage comprising a sugar-treated and heat-cured collagen casing of cohered unlimed hide collagen fibrils, said casing having a combined swell and deformation of no less than 5.5% and no more than 14.4% and containing a meat product whereby the sausage will retain a smooth symmetrical appearance after smoking.

10. An edible sausage comprising a translucent sugar-treated and heat-cured collagen casing having a combined swell and deformation of no less than 5.5% and no more than 14.4%, said casing being composed of non-collagenous fibrous material encapsulated in a matrix of unlimed hide collagen fibrils cohered to form a hyaloid structure, and containing a smoked beef product.

11. A smoked sausage comprising a sugar-cured collagen tube of cohered unlimed hide collagen fibrils filled with a wiener emulsion, the tube having a combined swell and deformation of no less than 5.5% and no more than 14.4% and adhering to said emulsion and edible therewith.

12. Smoked sausages comprising a continuous sugar-treated and heat-cured casing comprising cohered unlimed hide collagen fibrils, portions of said casing containing wiener emulsion and tied links in the casing forming a plurality of linked individual wiener sausages, said casing being characterized by a combined swell and deformation of no less than 5.5% and no more than 14.4%.

References Cited in the file of this patent

UNITED STATES PATENTS

| | | |
|---|---|---|
| 2,257,222 | Bergmann | Sept. 30, 1941 |
| 2,346,417 | Cornwell et al. | Apr. 11, 1944 |
| 2,704,259 | Lamb | Mar. 15, 1955 |
| 2,747,228 | Braun et al. | May 29, 1956 |
| 2,748,774 | Novak | June 5, 1956 |
| 2,852,812 | Braun | Sept. 23, 1958 |
| 2,866,710 | Dowd et al. | Dec. 30, 1958 |